(12) United States Patent
Gettler

(10) Patent No.: US 10,683,925 B2
(45) Date of Patent: Jun. 16, 2020

(54) GEAR TRAIN

(71) Applicant: SIEMENS AKTIENGESELLSCHAFT, München (DE)

(72) Inventor: Ralf Gettler, Borken (DE)

(73) Assignee: FLENDER GMBH, Bocholt (DE)

( * ) Notice: Subject to any disclaimer, the term of this patent is extended or adjusted under 35 U.S.C. 154(b) by 5 days.

(21) Appl. No.: 16/017,440

(22) Filed: Jun. 25, 2018

(65) Prior Publication Data

US 2018/0372206 A1 Dec. 27, 2018

(30) Foreign Application Priority Data

Jun. 26, 2017 (EP) .................................. 17177773

(51) Int. Cl.

| F16H 55/17 | (2006.01) |
| F16H 57/00 | (2012.01) |
| F16C 17/10 | (2006.01) |
| F16H 57/021 | (2012.01) |
| F16H 57/031 | (2012.01) |

(52) U.S. Cl.
CPC ......... *F16H 57/0025* (2013.01); *F16C 17/10* (2013.01); *F16H 57/021* (2013.01); *F16H 57/031* (2013.01); *F16C 2361/61* (2013.01)

(58) Field of Classification Search
CPC ...... F16H 57/021; F16H 57/031; F16C 17/10; F16C 2361/06
See application file for complete search history.

(56) References Cited

U.S. PATENT DOCUMENTS

| 5,921,137 A * | 7/1999 | Buri ........................ F16H 3/095 |
| | | 192/110 B |
| 8,919,216 B2 * | 12/2014 | Hunold ................... F16D 21/04 |
| | | 74/330 |
| 2002/0029646 A1 | 3/2002 | Takenaka et al. |

FOREIGN PATENT DOCUMENTS

| DE | 102009054595 A1 | 6/2011 |
| EP | 1298354 A2 | 4/2003 |

* cited by examiner

*Primary Examiner* — Jake Cook
(74) *Attorney, Agent, or Firm* — Henry M. Feiereisen LLC

(57) ABSTRACT

A gear train includes a housing, a shaft arranged in the housing, a gear wheel arranged on a first shaft shoulder, and first and second axial locks arranged on opposite sides of the gear wheel to axially secure the gear wheel. The second axial lock is attached to a second shaft shoulder having a diameter which is smaller than a diameter of the first shaft shoulder. A radial-axial sliding-contact bearing unit mounts the shaft in the housing and is attached to a third shaft shoulder disposed adjacent to the second shaft shoulder and defined by a diameter which is smaller than the diameter of the second shaft shoulder. A component attached to the shaft has a sliding surface for an axial sliding-contact bearing of the radial-axial sliding-contact bearing unit, with the second axial lock defining a running surface for the axial sliding-contact bearing of the radial-axial sliding-contact bearing unit.

10 Claims, 3 Drawing Sheets

GEAR TRAIN

CROSS-REFERENCES TO RELATED APPLICATIONS

This application claims the priority of European Patent Application, Serial No. EP 17177773.3, filed Jun. 26, 2018, pursuant to 35 U.S.C. 119(a)-(d), the disclosure of which is incorporated herein by reference in its entirety as if fully set forth herein.

BACKGROUND OF THE INVENTION

The present invention relates to a gear train.

The following discussion of related art is provided to assist the reader in understanding the advantages of the invention, and is not to be construed as an admission that this related art is prior art to this invention.

A gear train of a type involved here includes a housing and a shaft mounted therein. A gear wheel is attached to a first shaft shoulder, for example in the form of a spur gear, via a press fit, a groove-spring connection or the like. A first axial lock and a second axial lock are provided on the shaft to axially secure the gear wheel and accommodate the gear wheel between them. The first axial lock can, for example be formed, by a second shaft shoulder, the diameter of which is greater than the diameter of the first shaft shoulder receiving the gear wheel. A so-called groove nut is mostly used as the second axial lock, and is screwed onto the second shaft shoulder and presses against the gear wheel. German Industrial Standard DIN 981 distinguishes different designs of such groove nuts. A radial-axial slide-contact bearing unit is attached to a third shaft shoulder adjacent to but spaced apart from the second axial lock to radially and axially mount the shaft. The axial sliding-contact bearing of this radial-axial sliding-contact bearing unit requires running surfaces on both sides.

FIG. 1 shows a partial sectional view of a conventional gear train 1, which has a housing 2 and a shaft 3 arranged in the housing 2. Attached by a press fit to a shaft shoulder 4, which has a diameter $D_1$, is a gear wheel 5, which in this case is a spur gear. Two axial locks 6, 8 are provided for axially securing the gear wheel 5. The first axial lock 6 forms a shaft shoulder 7 with a diameter $D_4$ which is greater than the diameter $D_1$ of the shaft shoulder 4. The second axial lock 8 is a standard commercially available groove nut 9 which is screwed to a shaft shoulder 10 arranged adjacent to the shaft shoulder 4. The gear train 1 includes a radial-axial sliding-contact bearing unit 11 which mounts the shaft 3 in the housing 2 and is attached to a shaft shoulder 12 provided adjacent to the shaft shoulder 10. The shaft shoulder 12 has a diameter $D_3$ which is smaller than the diameter $D_2$ of the shaft shoulder 10. The radial-axial sliding-contact bearing unit 11 has an annular recess 13 that extends originating from its internal diameter, which enables the radial-axial sliding-contact bearing unit 11 to be slid over the groove nut 9 such that the end surface of the gear wheel 5 facing the radial-axial sliding-contact bearing unit 11 forms a running surface 14 for the axial sliding-contact bearing of the radial-axial sliding-contact bearing unit 11. The other running surface 15 is formed by an axial bearing support disk 16 which is attached to the end of the shaft 3. The axial bearing support disk 16 has an annular and axially projecting shoulder 17 which abuts the end face of the radial-axial sliding-contact bearing unit 11 facing away from the gear wheel 5 and forms the running surface 15. The housing 2 has a housing cover 18 attached thereto, which positions the radial-axial sliding-contact bearing unit 11 against a housing shoulder 19 in a direction of the gear wheel 5. The housing cover 18 is provided with an annular, axially projecting protrusion 20 which positions against the radially outer region of the radial-axial sliding-contact bearing unit 11.

The design of the gear train 1 has shortcomings because the manufacture of the radial-axial sliding-contact bearing unit 11 is expensive as a consequence of the need for the annular recess 13. Furthermore, the annular recess 13 also entails larger dimensions than comparable radial-axial sliding-contact bearing units without such a recess. This is in many cases not desirable.

FIG. 2 shows a partial sectional view of another conventional gear train 10 which differs from the gear train 1 according to FIG. 1 by the absence of an annular recess in the radial-axial sliding-contact bearing unit 11 and by the presence of a further support disk 21 which is slid onto the shaft shoulder 12. The support disk 21 abuts the confronting end face of the shaft shoulder 10 and forms the running surface 14 for the axial slide-contact bearing of the radial-axial sliding-contact bearing unit 11 on the end face of the radial-axial sliding-contact bearing unit 11. The remaining structure corresponds to that of gear train 1.

The design of the gear train 10 has also shortcomings because of the need for the support disk 21 as an additional element that has to be manufactured and fitted. This renders the design complex and increases costs.

It would therefore be desirable and advantageous to provide an improved drive train to obviate prior art shortcomings.

SUMMARY OF THE INVENTION

According to one aspect of the present invention, a gear train includes a housing, a shaft arranged in the housing, a gear wheel arranged on a first shaft shoulder defined by a diameter, a first axial lock arranged on one side of the gear wheel to axially secure the gear wheel, a second axial lock attached on another side of the gear wheel to a second shaft shoulder to axially secure the gear wheel, with the second shaft shoulder defined by a diameter which is smaller than the diameter of the first shaft shoulder, a radial-axial sliding-contact bearing unit configured to mount the shaft in the housing and attached to a third shaft shoulder disposed adjacent to the second shaft shoulder and defined by a diameter which is smaller than the diameter of the second shaft shoulder, and a component attached to the shaft and defining a sliding surface for an axial sliding-contact bearing of the radial-axial sliding-contact bearing unit, wherein the second axial lock is configured to define a running surface for the axial sliding-contact bearing of the radial-axial sliding-contact bearing unit.

In accordance with present invention, the second axial lock, which can be constructed advantageously in one piece, lies with its end faces both on the gear wheel and also on the radial-axial sliding-contact bearing unit. As a result, there is no need for special designs of the radial-axial sliding-contact bearing unit or for the provision of an additional support disk to form a sliding surface, so that a gear train can be realized in accordance with the present invention, which is simple in structure, inexpensive and of space-saving configuration.

According to another advantageous feature of the present invention, the gear wheel can be attached to the shaft via a taper interference fit. In this way a good and secure attachment of the gear wheel to the shaft is ensured.

According to another advantageous feature of the present invention, the first axial lock can be formed by a fourth shaft shoulder defined by a diameter which is greater than the diameter of the first shaft shoulder. As a result, the total number of individual parts of a gear train according to the present invention is reduced.

According to another advantageous feature of the present invention, the second axial lock can be an annular component which is screwed onto the second shaft shoulder via a thread. Advantageously, the annular component can have a depression for receiving a turning tool or screwdriver tool. In other words, attachment of the second axial lock to the shaft advantageously is established in a same way as for a conventional groove nut, thereby ensuring simple mounting.

According to another advantageous feature of the present invention, the second axial lock can have an end surface which points to the radial-axial sliding-contact bearing unit and can be dimensioned to form a sliding surface for the facing axial sliding-contact bearing of the radial-axial sliding-contact bearing unit.

According to another advantageous feature of the present invention, an axial bearing support disk can be provided to form a further running surface for the axial sliding-contact bearing of the radial-axial sliding-contact bearing unit, with the axial bearing support disk being attached to an end of the shaft and having an annular shoulder which projects axially and abuts the radial-axial sliding-contact bearing unit at an end side which faces away from the second axial lock and defines the sliding surface.

According to another advantageous feature of the present invention, a housing cover can be attached to the housing to position the radial-axial sliding-contact bearing unit against a housing shoulder in a direction of the gear wheel. As a result, the radially outer end of the radial-axial sliding-contact bearing unit is axially secured.

According to another advantageous feature of the present invention, the gear wheel can be embodied as a spur gear.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
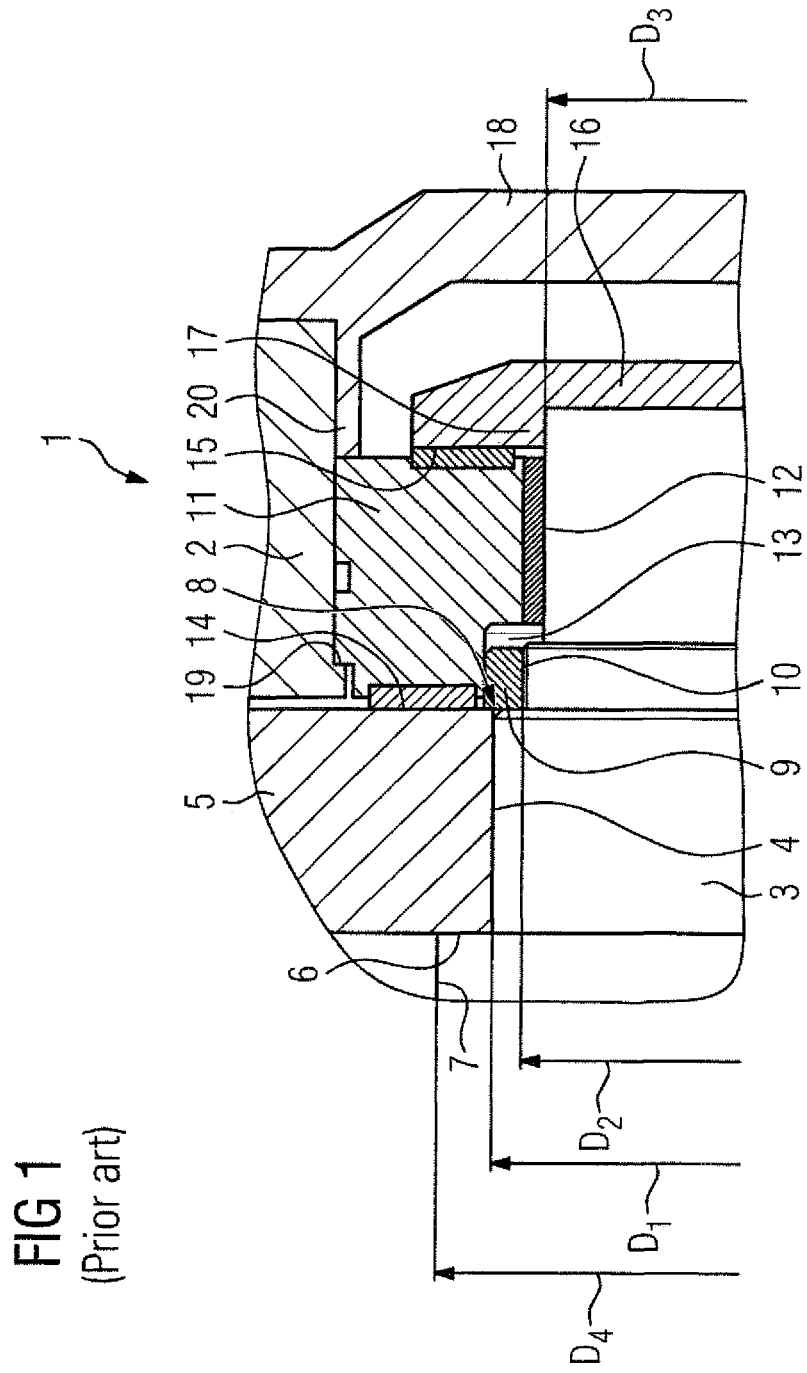
FIG. 1 is a schematic partial sectional view of a conventional gear train.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 2:
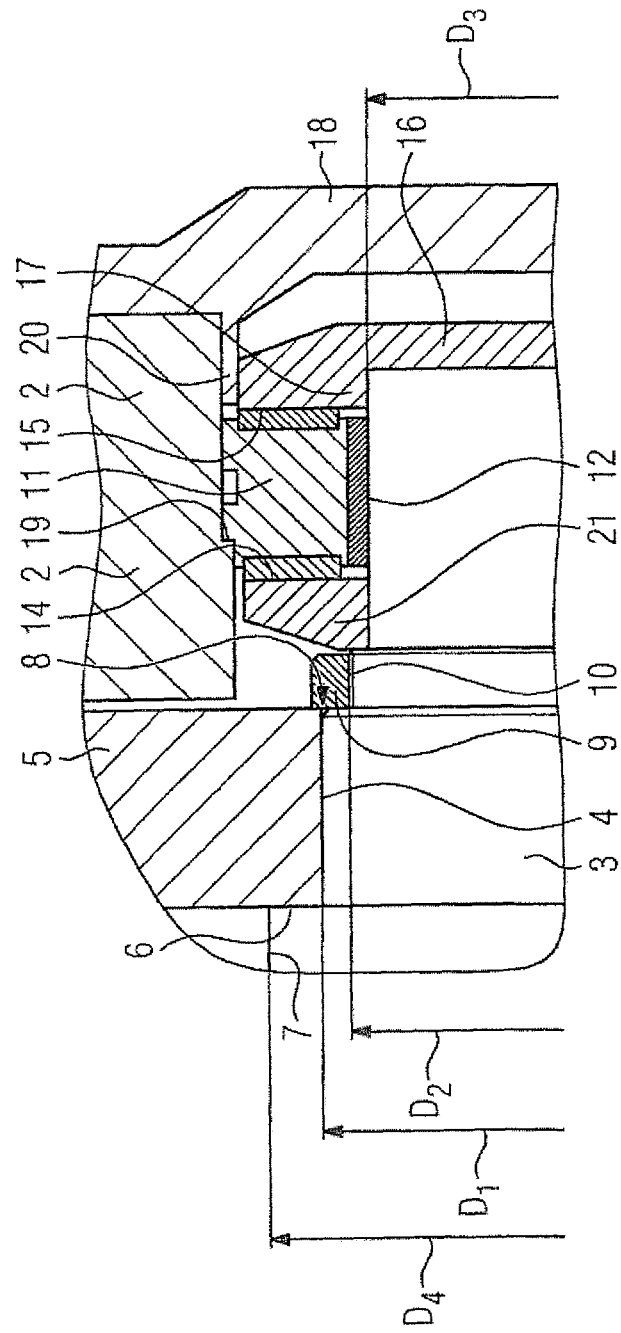
FIG. 2 is a schematic partial sectional view of another conventional gear train.
Figure 3:
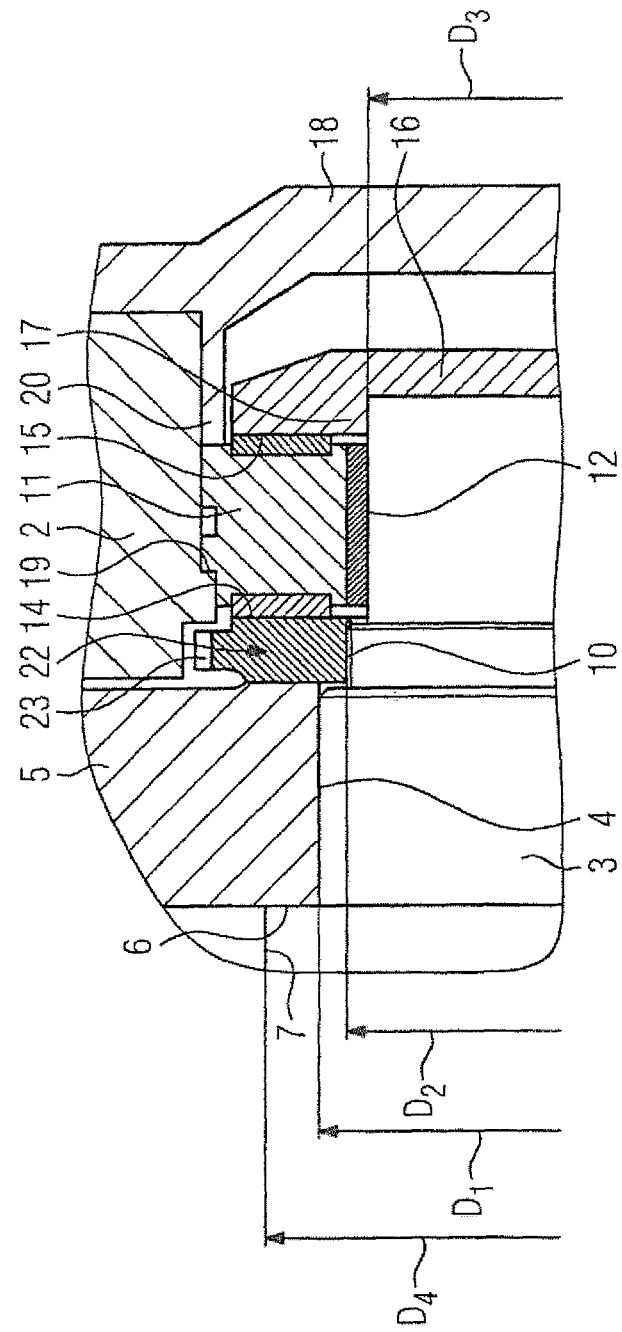
FIG. 3 is a schematic partial sectional view of one embodiment of a gear train according to the present invention.

Turning now to the drawing, and in particular to FIG. 3, there is shown a schematic partial sectional view of one embodiment of a gear train according to the present invention, generally designated by reference numeral 100. Parts corresponding with those in FIGS. 1 and 2 are denoted by identical reference numerals for sake of simplicity.

The gear train 100 includes a housing 2 and a shaft 3 arranged therein. A gear wheel 5, which may be constructed as a spur gear, is attached to a shaft shoulder 4 via a taper interference fit and is secured on both sides against axial movement by axial locks 6, 22, respectively. The first axial lock 6 forms a shaft shoulder 7 with a diameter $D_4$ which is greater than a diameter $D_1$ of the shaft shoulder 4. The second axial lock 22 is designed as an annular component which is screwed onto a shaft shoulder 10 via a suitable thread and is defined by a diameter $D_2$ which is smaller than the diameter $D_1$ of the shaft shoulder 4. The second axial lock 22 is provided with tool depressions 23 to receive a turning tool or screwdriver tool (not illustrated in greater detail). The tool reception depressions 23 are formed on an external periphery of the second axial lock 22 analogously to groove nut grooves. As an alternative to the presence of depressions 23, it may also be conceivable to provide axial or radial bores, polygons or the like, to name just a few examples.

The second axial lock 22 has an end face which points to the gear wheel 5 and forms a stop surface for the gear wheel 5. The second axial lock 22 has another end face which points to a radial-axial sliding-contact bearing unit 11 which mounts the shaft 3 in the housing 2 and is attached to a shaft shoulder 12 provided adjacent to the shaft shoulder 10. The shaft shoulder 12 has a diameter $D_3$ which is smaller than the diameter $D_2$ of the shaft shoulder 10. The end face of the second axial lock 22 in confronting relation to the radial-axial sliding-contact bearing unit 11 is dimensioned such that a facing immediately adjacent axial sliding-contact bearing of the radial-axial sliding-contact bearing unit 11 fully abuts this end face. Thus, this end face defines a running surface 14 for the axial sliding-contact bearing of the radial-axial sliding-contact bearing unit 11. A further running surface 15 for the axial sliding-contact bearing of the radial-axial sliding-contact bearing unit 11 is formed by a further component that is attached to the shaft 3 and embodied by an axial bearing support disk 16 which is attached to the axial end of the shaft 3. The axial bearing support disk 16 has an annular, axially projecting shoulder 17 which abuts the end face of the radial-axial sliding-contact bearing unit 11 facing away from the second axial lock 22 and defines the sliding surface 15. Attached to the housing 2 is a housing cover 18 which positions the radial-axial sliding-contact bearing unit 11 against a housing shoulder 19 via an axially projecting, annularly designed protrusion 20 in a direction of the gear wheel 5.

In the gear train 100 according to the present invention, the second axial lock 22 serves a dual function involving on one hand an axial securement of the gear wheel 5 and, on the other hand, the establishment of the running surface 14 for the axial slide-contact bearing of the radial-axial sliding-contact bearing unit 11. The second axial lock 22 has an inexpensive structure by virtue of few individual parts and requires little space for the arrangement of the radial-axial sliding-contact bearing unit 11.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A gear train, comprising:
   a housing;
   a shaft arranged in the housing and configured to include first, second and third shaft shoulders;
   a gear wheel arranged on the first shaft shoulder defined by a diameter;
   a first axial lock arranged on one side of the gear wheel to axially secure the gear wheel;
   a second axial lock attached on another side of the gear wheel to the second shaft shoulder to axially secure the gear wheel, with the second shaft shoulder defined by a diameter which is smaller than the diameter of the first shaft shoulder;
   a radial-axial sliding-contact bearing unit configured to mount the shaft in the housing and attached to the third shaft shoulder disposed adjacent to the second shaft shoulder and defined by a diameter which is smaller than the diameter of the second shaft shoulder; and
   a component attached to the shaft and defining a sliding surface for an axial sliding-contact bearing of the radial-axial sliding-contact bearing unit,
   said second axial lock being configured to define a running surface for the axial sliding-contact bearing of the radial-axial sliding-contact bearing unit.

2. The gear train of claim 1, wherein the gear wheel is attached to the shaft via a taper interference fit.

3. The gear train of claim 1, wherein the first axial lock is formed by a fourth shaft shoulder defined by a diameter which is greater than the diameter of the first shaft shoulder.

4. The gear train of claim 1, wherein the second axial lock is an annular component.

5. The gear train of claim 4, wherein the annular component is screwed onto the second shaft shoulder via a thread.

6. The gear train of claim 4, wherein the annular component has a depression for receiving a turning tool or screwdriver tool.

7. The gear train of claim 1, wherein the second axial lock has an end surface which points to the radial-axial sliding-contact bearing unit and is dimensioned to form the running surface for the facing axial sliding-contact bearing of the radial-axial sliding-contact bearing unit.

8. The gear train of claim 1, wherein the component is an axial bearing support disk attached to an end of the shaft and having an annular shoulder which projects axially and abuts the radial-axial sliding-contact bearing unit at an end side which faces away from the second axial lock and defines the sliding surface.

9. The gear train of claim 1, further comprising a housing cover attached to the housing and configured to position the radial-axial sliding-contact bearing unit against a housing shoulder in a direction of the gear wheel.

10. The gear train of claim 1, wherein the gear wheel is a spur gear.

* * * * *